United States Patent
Madappa (10) Patent No.: US 12,452,667 B2
(45) Date of Patent: Oct. 21, 2025

(54) OBTAINING PRE-SHARED KEYS FOR WIRELESS DEVICES USING A REFERENCE SHARED WITH THE WIRELESS DEVICES

(71) Applicant: HEWLETT PACKARD ENTERPRISE DEVELOPMENT LP, Spring, TX (US)

(72) Inventor: Savitha Ponjanda Madappa, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 346 days.

(21) Appl. No.: 18/298,621

(22) Filed: Apr. 11, 2023

(65) Prior Publication Data

US 2024/0349052 A1    Oct. 17, 2024

(51) Int. Cl.
H04W 12/069     (2021.01)
H04W 12/73      (2021.01)
H04W 84/12      (2009.01)

(52) U.S. Cl.
CPC ......... *H04W 12/069* (2021.01); *H04W 12/73* (2021.01); *H04W 84/12* (2013.01)

(58) Field of Classification Search
CPC ... H04W 12/06; H04W 12/069; H04W 12/71; H04W 12/73; H04W 12/77; H04W 84/12
See application file for complete search history.

(56) References Cited

U.S. PATENT DOCUMENTS

| | | | |
|---|---|---|---|
| 6,831,942 B2 | 12/2004 | Guo et al. | |
| 8,094,610 B2 | 1/2012 | Wang et al. | |
| 9,742,460 B2 | 8/2017 | Kwon et al. | |
| 9,948,486 B2 | 4/2018 | Wang et al. | |
| 10,312,996 B2 | 6/2019 | Choquette | |
| 2003/0227867 A1 | 12/2003 | Xiong | |
| 2005/0190827 A1 | 9/2005 | Xu et al. | |
| 2020/0092139 A1 | 3/2020 | Nandy et al. | |
| 2021/0360400 A1 | 11/2021 | Ficara et al. | |
| 2024/0015509 A1* | 1/2024 | Kopka | H04W 12/069 |
| 2024/0121609 A1* | 4/2024 | Neipris | H04W 12/043 |

FOREIGN PATENT DOCUMENTS

WO    2006/075243 A1    7/2006

OTHER PUBLICATIONS

Multi Pre-Shared Key downloaded Feb. 2, 2023 (1 page).
Techopedia, Wi-Fi Protected Access Pre-Shared Key (WPA-PSK), Jun. 23, 2020 (11 pages).
Wikipedia, Pre-shared key last edited Mar. 16, 2022 (1 page).

* cited by examiner

*Primary Examiner* — Nguyen T Vo
(74) *Attorney, Agent, or Firm* — Trop, Pruner & Hu, P.C.

(57) ABSTRACT

In some examples, a system receives, from an identity and access management server, information of whether a portal for obtaining pre-shared keys (PSKs) is enabled. Responsive to receiving an indication that the portal for obtaining PSKs is enabled, the system adds, to a policy, a service set identifier (SSID) that is associated with use of a multi-pre-shared key (MPSK) arrangement. The system retrieves, in response to the policy, a reference useable by wireless devices to obtain respective PSKs of the wireless devices, and outputs a representation of the reference to share with the wireless devices to obtain from the portal the respective PSKs by the wireless devices for connecting to the WLAN.

14 Claims, 6 Drawing Sheets

OBTAINING PRE-SHARED KEYS FOR WIRELESS DEVICES USING A REFERENCE SHARED WITH THE WIRELESS DEVICES

BACKGROUND

A wireless device is an electronic device that includes a wireless communications component to establish a wireless connection to a wireless network. Once connected to the wireless network, the wireless device can communicate data with other devices over the wireless network.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

An example type of a wireless network is a Wi-Fi network, also referred to as a Wireless Local Area Network (WLAN). In a WLAN, a Wi-Fi Protected Access II (WPA2) security mechanism can be employed. In some examples, a home or small office WLAN can employ a WPA2 pre-shared key (PSK) protection mechanism. WPA2-PSK is also referred to as WPA2 Personal.

With WPA2-PSK, an access point (AP) of the WLAN can be configured with a passphrase (also referred to as a PSK) including a sequence of characters (e.g., letters, numerals, symbols, etc.) having a length that is within a specified length range. The passphrase is a shared secret that is to be sent by a wireless device to the AP to allow the wireless device to wirelessly connect to the AP. In some examples, the same passphrase (a common PSK) is used by all wireless devices that connect to a WLAN.

In further examples, multiple PSKs (passphrases) can be employed by wireless devices that connect to a WLAN. This type of arrangement is referred to as a multi-PSK (MPSK) arrangement, in which different PSKs can be individually assigned to wireless devices and/or groups of wireless devices. For example, different PSKs can be assigned to respective different individual wireless devices, and/or different PSKs can be assigned to respective different groups of wireless devices. With the MPSK arrangement, a WLAN having a service set identifier (SSID) can employ multiple PSKs. An SSID is a name of the WLAN. The use of multiple PSKs provides improved security as compared to a WLAN that uses a common PSK for all wireless devices connected to the WLAN.

Traditionally, a user obtains a PSK (passphrase) for a wireless device by registering the wireless device with a Remote Authentication Dial-In User Service (RADIUS) authentication server, which involves providing a network address such as a Media Access Control (MAC) address of the wireless device to the RADIUS authentication server before the user can obtain the PSK. In such a registration process, the user provides, through a registration portal or using another mechanism (such as email, etc.), the MAC address of the wireless device. The registration process using the registration portal or another mechanism is performed for a user to obtain the PSK for the wireless device so that the wireless device can connect to the WLAN. RADIUS is a protocol for use in authenticating and authorizing users.

It can be challenging for a user to determine the MAC address of the wireless device. For example, some users may not know where to find MAC addresses of wireless devices. Further, having to contact technical support to obtain assistance in finding a MAC address of a wireless device can be a time-consuming process that can lead to delays in wireless device registration.

In accordance with some implementations of the present disclosure, a registration-less mechanism is provided to allow a wireless device to obtain a PSK for connecting to a WLAN without first having to provide a MAC address of the wireless device. A "registration-less" mechanism refers to a mechanism in which a user of a wireless device does not use a registration portal or another mechanism to enter information (including a MAC address of the wireless device) for the purpose of obtaining the PSK for the wireless device. In some examples of the present disclosure, the PSKs for respective wireless devices (and/or groups of wireless devices) in a MPSK arrangement of the WLAN are not bound to MAC addresses, so that the PSKs can be created independently of the MAC addresses.

The registration-less mechanism employs a cloud authentication server that supports the provision of PSKs to wireless devices in an MPSK arrangement by sharing information including a reference useable by the wireless devices to access a resource associated with the reference to obtain the PSKs. A "cloud authentication server" refers to an authentication server that is deployed in a cloud environment. The cloud authentication server can be accessed by any of various tenants, where a "tenant" refers to a group of users. An "authentication server" refers to a server that performs authentication of wireless devices (or users of the wireless devices) before the wireless devices are allowed to connect to a WLAN. A "server" can be implemented with a collection of computers. As used here, a "collection" of items can refer to a single item or multiple items; thus, a collection of computers can refer to a single computer or multiple computers.

Although reference is made to a cloud authentication server in some examples, other types of authentication servers can be employed in other examples. The other types of authentication servers can be located remotely from the WLAN or can be part of the WLAN.

In some examples, the "reference" shared with wireless devices for obtaining PSKs can include a uniform resource locator (URL), which identifies a resource on a network (e.g., the Internet or another type of network) associated with provisioning PSKs. More generally, the "reference" can include information useable to access the resource for obtaining the PSKs. Other examples of such information can include a filename, an object identifier, a storage address, and so forth.

The resource indicated by the reference can include an MPSK portal accessible by wireless devices to obtain PSKs usable by the wireless devices to connect to a WLAN. The "MPSK portal" differs from the "registration portal" noted above in that the MPSK portal allows a wireless device accessing the MPSK portal to obtain a corresponding PSK without the wireless device (or a user of the wireless device) having to first enter a MAC address of the wireless device. A "portal" can refer to any type of interface by which a wireless device or a user of the wireless device can obtain information from another entity.

Figure 1:
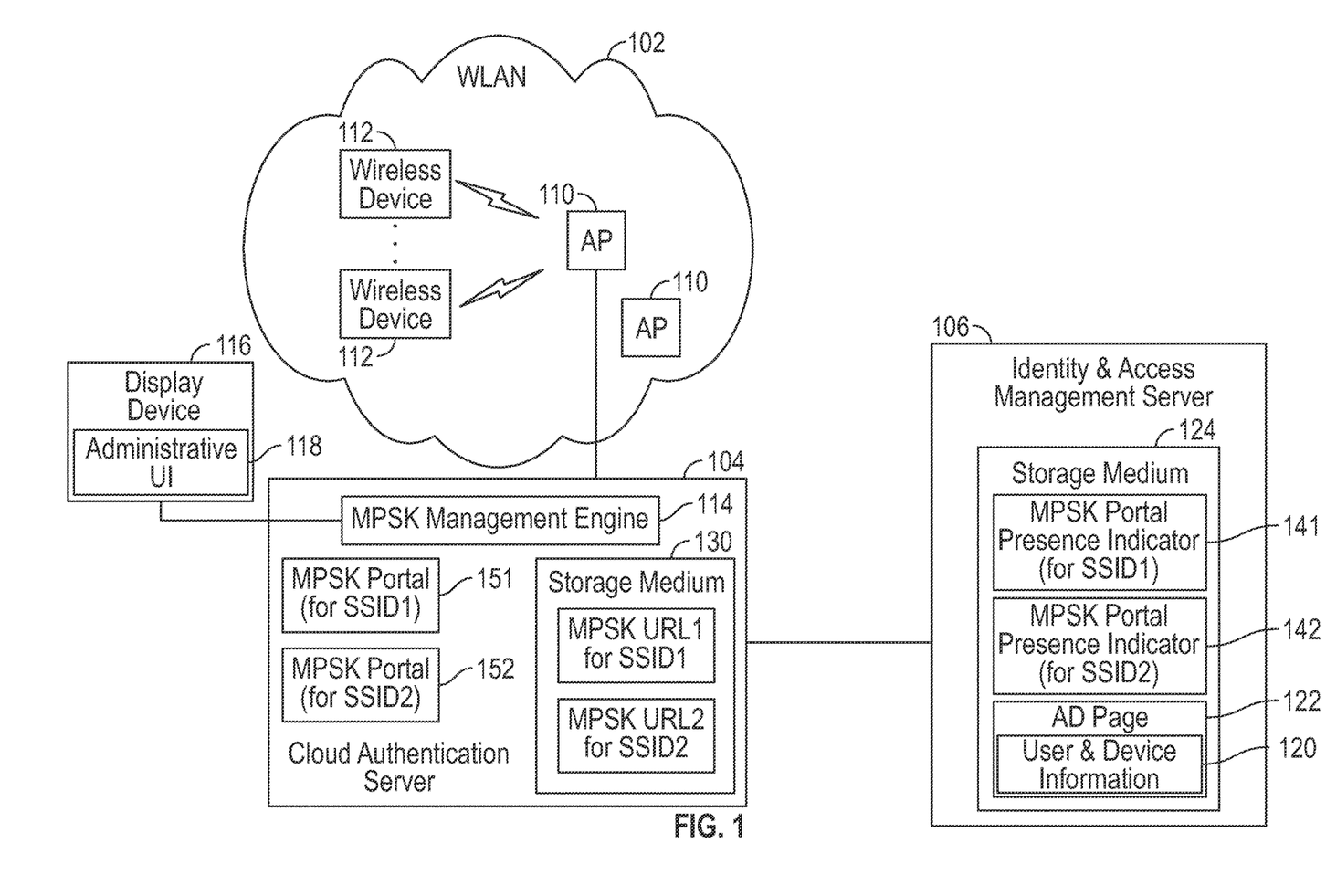
FIG. 1 is a block diagram of an arrangement that includes a wireless local area network (WLAN), a cloud authentication server, and an identity and access management server, according to some examples.

FIG. 1 is a block diagram of an example arrangement that includes a WLAN 102 (or multiple WLANs), a cloud authentication server 104, and an identity and access management server 106. Although FIG. 1 shows the cloud authentication server 104 and the identity and access management server 106 as being separate servers, it is noted that in other examples, the cloud authentication server 104 and the identity and access management server 106 can be integrated together. The cloud authentication server 104 can provide authentication and authorization services as well as present an administrative user interface (UI) 118 as discussed further below.

The WLAN 102 includes an AP 110 (or alternatively, multiple APs) to which various wireless devices 112 are able to wirelessly connect. Examples of wireless devices include any or some combination of the following: a desktop computer, a notebook computer, a tablet computer, a smartphone, a game appliance, a vehicle, a household appliance, an Internet-of-things (IoT) device, a storage system, and so forth.

The WLAN 102 is assigned an SSID, which is a name of the WLAN. Although FIG. 1 shows just one WLAN, in further examples, there may be multiple WLANs assigned respective different SSIDs. In other examples, the AP 110 can support multiple SSIDs for respective different WLANs.

A wireless device 112 can establish a wireless connection with the AP 110 by associating with the AP 110. To associate with the AP 110, the wireless device 112 can perform an authentication and association procedure with the AP 110. In some examples, the authentication and association procedure can be according to Institute of Electrical and Electronics Engineers (IEEE) 802.11 standards.

The wireless device 112 can further perform an encryption key establishment procedure to obtain a collection of encryption keys (a single encryption key or multiple encryption keys) to use in encrypting data exchanged between the wireless device 112 and the AP 110. An encryption key establishment procedure can be according to the Extensible Authentication Protocol (EAP) over Local Area Network (LAN) (EAPOL) protocol. The EAPOL encryption key establishment procedure allows the wireless device 112 (referred to as a "supplicant") and the AP 110 (referred to as an "authenticator") to determine the collection of encryption keys used for encrypting data exchanged between the wireless device 112 and the WLAN 102. Examples of encryption keys that can be determined using the EAPOL encryption key establishment procedure includes a pairwise transient key (PTK) (to encrypt unicast data) and a groupwise temporal key (GTK) (to encrypt multicast or broadcast data).

Although reference is made to specific standards or protocols in some examples, it is noted that in other examples, other types of standards and protocols can be employed. Standards and protocols can be defined by a standards body, can be an open-source standard or protocol, or can be a proprietary standard or protocol.

The AP 110 is connected to the cloud authentication server 104. In some examples, the cloud authentication server 104 provides centralized authentication services to allow remote users of wireless devices to connect to a given network, such as the WLAN 102. In some examples, the cloud authentication server 104 can perform authentication services according to the RADIUS protocol. In other examples, the cloud authentication server 104 can provide authentication services according to other protocols.

In accordance with some implementations of the present disclosure, the cloud authentication server 104 includes an MPSK management engine 114 that supports the provision of PSKs to wireless devices using a registration-less mechanism as noted above. As used here, an "engine" can refer to one or more hardware processing circuits in the cloud authentication server 104, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits in the cloud authentication server 104. As more specific examples in the cloud context, the machine-readable instructions can implement microservices running in the cloud to handle tasks of the cloud authentication server as discussed further below.

In accordance with some examples of the present disclosure, the MPSK management engine 114 can interact with the AP 110 and the identity and access management server 106. Additionally, the MPSK management engine 114 can present the administrative UI 118 to allow an administrator (e.g., a human administrator responsible for configuring the WLAN 102 to support MPSK services) to receive information and provide information pertaining to setting up the MPSK capabilities of the WLAN 102. In some examples, the administrative UI 118 can be displayed by a display device 116 coupled to the cloud authentication server 104. The display device 116 may be directly connected to the cloud authentication server 104, or the display device 116 may be part of an electronic device coupled to the cloud authentication server 104.

In some examples, the identity and access management server 106 can include an Azure Active Directory (AD), a Microsoft AD, or any other type of identity and access management server. Generally, an "identity and access management server" refers to a server that maintains information associated with users, including identity information (e.g., login information including a username and password, certificates, etc.) of users, policies associated with users, network information for wireless devices of users, and so forth. Collectively, the foregoing information can be referred to as "user and device information." In some examples, the identity and access management server 106 can store user and device information 120 associated with a given user in an AD page 122 associated with a corresponding user. The "AD page" can refer to any data structure that can store the user and device information 120, including user identity information, policies such as user or access policies, network information such as virtual local area network (VLAN) information, and so forth. The information in the AD page can be accessed by a wireless device of the user once the user is authenticated. The AD page 122 can in the form of a file, a table in a database, or any other type of data structure. The AD page 122 can be stored in a storage medium 124 of the identity and access management server 106. A "storage medium" can be implemented using a collection of storage devices, such as disk-based storage devices, solid-state drives, and/or memory devices.

In some examples, multiple AD pages can be associated with respective different users. Each such AD page stores user and device information of the respective user.

In accordance with some examples of the present disclosure, the storage medium 124 of the identity and access management server 106 can also store an MPSK portal presence indicator, which indicates the presence of an MPSK portal that can be accessed by wireless devices 112 to obtain corresponding PSKs in an MPSK arrangement. In the example of FIG. 1, the identity and access management server 106 stores multiple MPSK portal presence indicators 141 and 142 in the storage medium 124. The MPSK portal presence indicator 141 is to indicate the presence of an MPSK portal 151 for a first SSID (SSID1), and the MPSK portal presence indicator 141 is to indicate the presence of an MPSK portal 152 for a second SSID (SSID2).

The example of FIG. 1 assumes there are two SSIDs for two respective WLANs. In other examples, there can be just one WLAN or more than two WLANs with respective assigned SSIDs.

If the MPSK portal presence indicator 141 is not present in the identity and access management server 106, then that is an indication that the MPSK portal 151 for SSID1 is not present, such that the wireless devices 112 of the WLAN 102 would not be able to obtain PSKs using the MPSK portal 151. Similarly, if the MPSK portal presence indicator 142 is not present in the identity and access management server 106, then that is an indication that the MPSK portal 152 for SSID2 is not present, such that the wireless devices 112 of the WLAN 102 would not be able to obtain PSKs using the MPSK portal 152.

In some examples, each MPSK portal presence indicator 141 or 142 can be in the form of a flag that can be set to one of multiple different values. The flag can include a collection of bits (a single bit or multiple bits) stored in the storage medium 124. If the flag is set to a first value, then that indicates that the respective MPSK portal 151 or 152 is present. However, if the flag is set to a second value different from the first value, then that indicates that the respective MPSK portal 151 or 152 is not present.

The MPSK portals 151 and 152, which are interfaces that allow retrieval of PSKs by wireless devices, are provided by the cloud authentication server 104. Each MPSK portal 151 or 152 is a resource of the cloud authentication server 104 that can be accessed by a wireless device using a respective MPSK URL.

The cloud authentication server 104 further includes a storage medium 130 that stores MPSK URLs, which are references to respective MPSK portals. In the example of FIG. 1, the storage medium 130 of the cloud authentication server 104 stores a first MPSK URL ("MPSK URL1") that is associated with the first SSID (SSID1), and a second MPSK URL ("MPSK URL2") that is associated with a second SSID (SSID2). In examples where there is just one SSID, then there would be just one MPSK URL maintained by the cloud authentication server 104.

The MPSK URL1 maintained by the cloud authentication server 104 can be provided to a wireless device 112 for use by the wireless device 112 in accessing the MPSK portal 151 to retrieve a corresponding PSK for the wireless device 112 to communicate with a WLAN identified by SSID1. Similarly, the MPSK URL2 maintained by the cloud authentication server 104 can be provided to a wireless device 112 for use by the wireless device 112 in accessing the MPSK portal 152 to retrieve a corresponding PSK for the wireless device 112 to communicate with a WLAN identified by SSID2.

Figure 2:
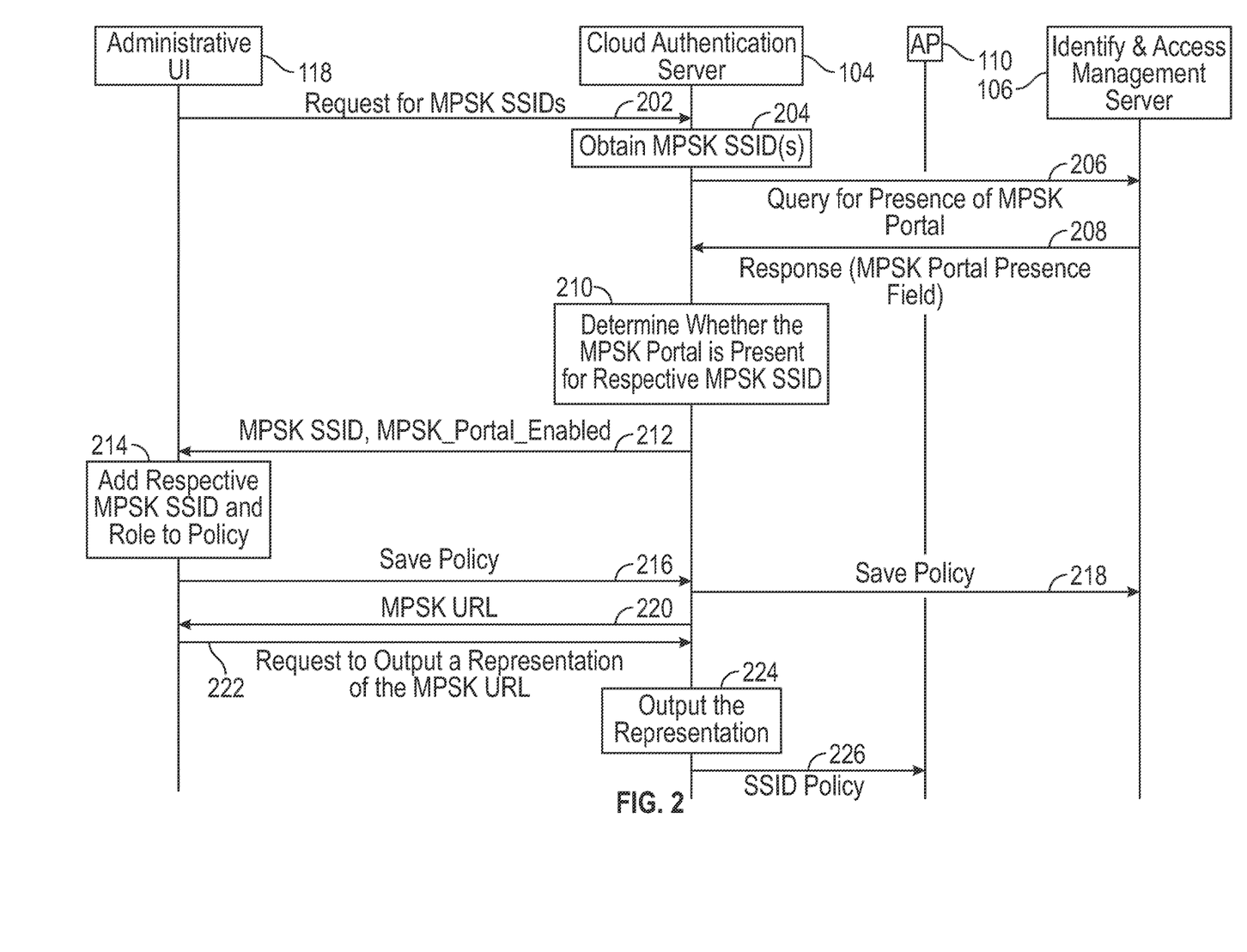
FIG. 2 is a flow diagram of a process performed by an administrative user interface (UI), a cloud authentication server, an access point (AP), and an identity and access management server, according to some examples.

FIG. 2 is a flow diagram of a process performed by the administrative UI 118, the cloud authentication server 104, the AP 110, and the identity and access management server 106, according to some examples.

An administrator can access the administrative UI 118 to perform various tasks relating to the configuration of the WLAN 102. For example, the administrator can provide an input in the administrative UI 118 that causes the administrative UI 118 to send (at 202) a request to retrieve MPSK SSIDs. An "MPSK SSID" identifies a WLAN that supports use of multiple PSKs assigned to individual wireless devices or groups of wireless devices (i.e., an MPSK arrangement). In response to the request (at 202), the MPSK management engine 114 (FIG. 1) in the cloud authentication server 104 obtains (at 204) one or more MPSK SSIDs. The MPSK management engine 114 can obtain the one or more MPSK SSIDs from a local storage medium of the cloud authentication server 104 or from another entity at which the MPSK SSIDs can be stored.

In response to obtaining the one or more MPSK SSIDs, the MPSK management engine 114 in the cloud authentication server 104 queries (at 206) the identity and access management server 106 to obtain information regarding whether an MPSK portal for each MPSK SSID is present. Each query from the MPSK management engine 114 to the identity and access management server 106 can include a respective MPSK SSID. In response to the query, the identity and access management server 106 determines whether an MPSK portal presence indicator (e.g., 141 or 142 in FIG. 1) is stored by the identity and access management server 106 for the respective MPSK SSID. For example, if the query includes SSID1 (in the example of FIG. 1), then the identity and access management server 106 determines whether the MPSK portal presence indicator 141 is present in the storage medium 124 of the identity and access management server 106.

If the identity and access management server 106 determines that the MPSK portal presence indicator is present for the respective MPSK SSID, the identity and access management server 106 sends (at 208) a response to the cloud authentication server 104, where the response includes an MPSK portal presence field indicating whether or not the MPSK portal for the respective MPSK SSID is present. The MPSK portal presence field in the response is settable to one of multiple values, e.g., if the MPSK portal presence field is set to a first value, then that indicates the MPSK portal for the MPSK SSID is present, but if the MPSK portal presence field is set to a different second value, then that indicates the MPSK portal for the MPSK SSID is not present. If multiple queries containing corresponding different MPSK SSIDs are sent by the MPSK management engine 114 to identity and access management server 106, then the identity and access management server 106 sends corresponding responses with the MPSK portal presence fields.

Based on the received responses from the identity and access management server 106 for each respective MPSK SSID, the MPSK management engine 114 determines (at 210) whether an MPSK portal is present for the respective MPSK SSID.

The MPSK management engine 114 sends (at 212) each respective MPSK SSID obtained by the MPSK management engine 114 to the administrative UI 118, along with an indication of whether or not an MPSK portal is enabled for the respective MPSK SSID. The indication sent by the MPSK management engine 114 can be in the form of an MPSK_Portal_Enabled flag, which can be set to a first value to indicate that the MPSK portal for the respective MPSK SSID is enabled, and a different second value to indicate that the MPSK portal for the respective MPSK SSID is not enabled. The sending of the MPSK_Portal_Enabled flag set to the first value to the administrative UI 118 can cause presentation, in the administrative UI 118, of an indicator that the MPSK portal for obtaining PSKs is enabled.

In response to receiving (at 212) the respective MPSK SSID and a corresponding indication that the MPSK portal is enabled for the respective MPSK SSID, the administrator can control the administrative UI 118 to add (at 214) the respective MPSK SSID into a policy for a given user or group of users. Note that if there are multiple MPSK SSIDs associated with the given user or group of users, multiple MPSK SSIDs can be added to the policy. The administrator controlling the administrative UI 118 can refer to the administrator making selections and/or inputting information into the administrative UI 118 to request actions to be performed by the administrative UI 118.

In some examples, there are multiple policies associated with respective multiple users or groups of users. In such examples, the administrator can control the administrative UI 118 to add (at 214) the MPSK SSIDs into respective policies for the multiple users or groups of users. In addition to adding MPSK SSID(s) to each policy, the administrator can control the administrative UI 118 to add (at 214) information of role(s) of a respective user or group of users into each policy. A "role" refers to a role of a user (group) in the WLAN identified by an MPSK SSID. For example, a first role can be an employee role where wireless devices of employees have access to designated resources of the WLAN. A second role can be a guest role where wireless devices of guests have access to a reduced set of resources of the WLAN (as compared to the designated resources accessible by employees).

The administrator can control the administrative UI 118 to save the updated policy (updated by the addition of MPSK SSID(s) and information of role(s) of a user or group of users) to the identity and access management server 106. The administrative UI 118 can send (at 216) an indication to save the policy to the cloud authentication server 104, which in turn can send (at 218) an indication to save the policy to the identity and access management server 106.

Upon receiving the policy (policies) from the cloud authentication server 104, the identity and access management server 106 can save information of the policy(ies) into respective AD pages 122 (FIG. 1) stored at the identity and access management server 106. Saving information of a policy into a respective AD page (which is associated with a respective user) allows the identity and access management server 106 to later determine, based on the respective AD page, that the respective user is able to obtain a PSK from an MPSK portal, and further, the identity and access management server 106 can determine a role of the user when the user is authenticated for accessing the WLAN using the PSK.

Responsive to receiving the policy from the administrative UI 118, the cloud authentication server 104 sends (at 220) an MPSK URL (e.g., MPSK URL1 or MPSK URL2 in FIG. 1) to the administrative UI 118. The MPSK URL sent (at 220) is a reference to the respective MPSK portal (e.g., 151 or 152 in FIG. 1) for a corresponding SSID.

Upon receiving the MPSK URL, the administrator can control the administrative UI 118 to send (at 222), to the cloud authentication server 104, a request to output a representation of the MPSK URL. In response to the request to output the representation of the MPSK URL, the cloud authentication server 104 outputs (at 224) the representation, such as in the form of a QR code (e.g., displayed by one or more display devices), a message (e.g., an email message or text message) sent to a wireless device, or any other output information usable by a wireless device to access the respective MPSK portal (151 or 152) at the MPSK URL.

Note that tasks 220 and 224 can be re-iterated for other MPSK URLs for other MPSK portals, such as those associated with other SSIDs.

In some examples, the cloud authentication server 104 can further send (at 226) an SSID profile of the WLAN identified by a respective SSID to an AP (e.g., 110) of the WLAN. The cloud authentication server 104 includes in the SSID profile an indication that the cloud authentication server 104 is to be employed for authenticating access of a wireless device to the WLAN. The SSID profile is stored at the AP. When the AP receives a request from the wireless device to associate with the AP, the AP can access the SSID profile to make a determination to use the cloud authentication server 104 for authenticating the wireless device. Use of the cloud authentication server 104 allows for support of providing PSKs to wireless devices using a registration-less mechanism according to some examples of the present disclosure.

In the example of FIG. 2, it is assumed that a policy already exists for a user or a group of users. The administrator in such an example can control the administrative UI 118 to add MPSK SSID(s) and information of role(s) to the existing policy.

In other examples, a policy may not yet exist for a user or group of users. In such other examples, the administrator can control the administrative UI 118 to create the policy into which MPSK SSID(s) and information of role(s) can be added.

Figure 3A:
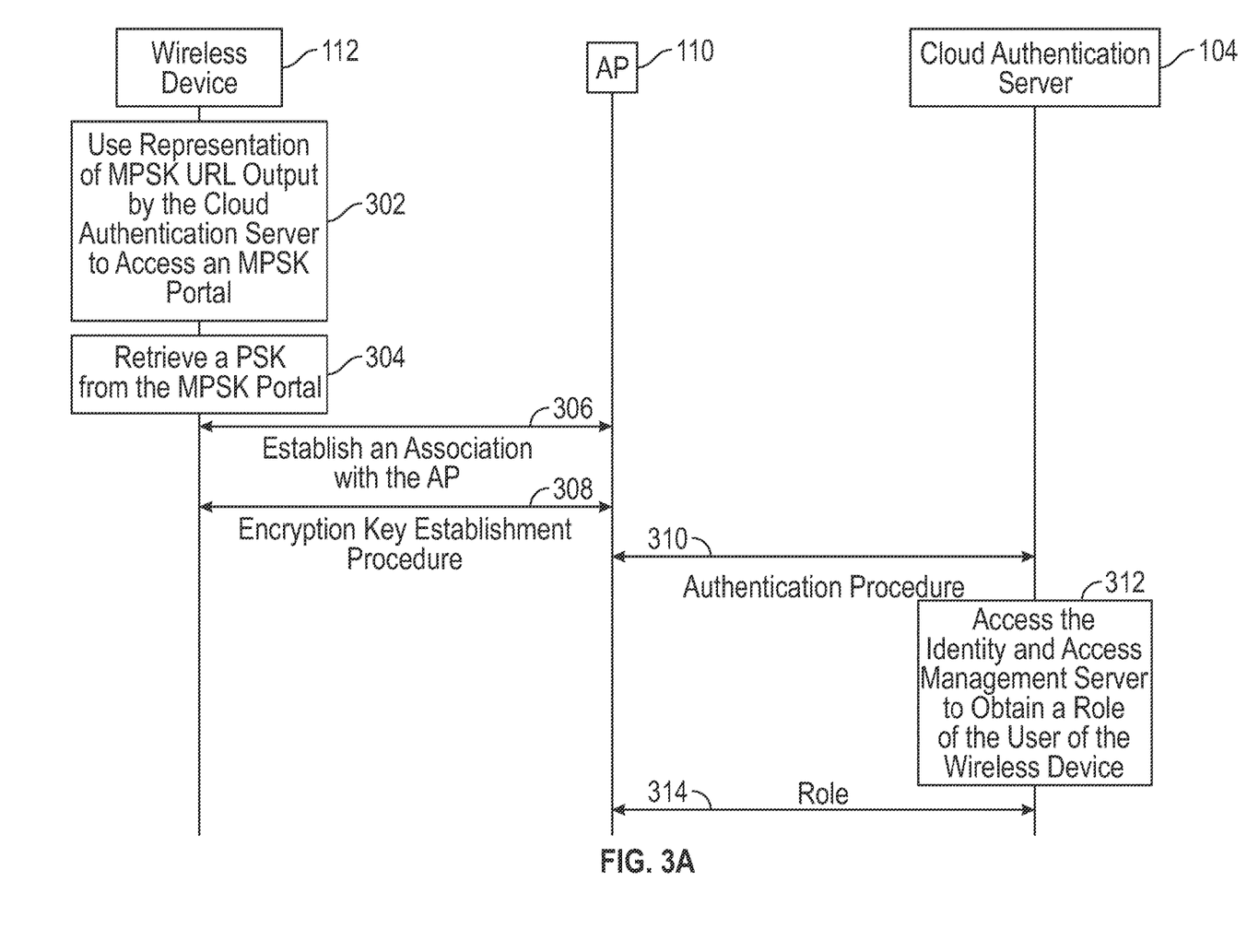
FIG. 3A is a flow diagram of a process for authenticating a wireless device that is attempting to access a WLAN, according to some examples.

FIG. 3A is a flow diagram of a process performed by a wireless device 112, the AP 110, and the cloud authentication server 104 to allow the wireless device 112 to obtain a PSK to access the WLAN 102.

The wireless device 112 uses (at 302) the representation of an MPSK URL output by the cloud authentication server 104 (e.g., at 236 in FIG. 2) to access an MPSK portal referenced by the MPSK URL. For example, if the representation of the MPSK URL is in the form of a QR code, a camera of the wireless device 112 can scan the QR code to obtain the MPSK URL. In another example, if the representation of the MPSK URL is in the form of a message sent to the wireless device 112, the wireless device 112 can retrieve the MPSK URL from the message.

The wireless device 112 retrieves (at 304) a PSK from the MPSK portal accessed using the MPSK URL. The wireless device 112 then establishes an association (at 306) with the AP 110 using the PSK. The establishment of the association can use an IEEE 802.11 authentication and association procedure, for example.

The wireless device 112 can also perform (at 308) an encryption key establishment procedure (e.g., according to EAPOL) with the AP 110 to obtain encryption keys to use in encrypting data communicated between the wireless device 112 and the AP 110.

As part of authenticating the wireless device 112, the AP 110 can also perform (at 310) an authentication procedure (e.g., according to the RADIUS protocol) with the cloud authentication server 104. In the authentication procedure, the cloud authentication server 104 receives an authentication request from the AP 110, and the cloud authentication server sends an authentication response in response to the authentication request. As noted above, the AP 110 previously received an SSID profile (task 226 in FIG. 2) that includes an indication that the cloud authentication server 104 is to be employed for authenticating access of wireless devices to the WLAN 102. In response to the SSID profile, the AP performs (at 310) the authentication procedure with the cloud authentication server 104.

In the authentication procedure, the AP 110 sends to the cloud authentication server 104 various user/wireless device information received by the AP 110 from the wireless device 112 in messages of the authentication and association procedure (306) and the encryption key establishment procedure (308). The cloud authentication server 104 can access (at 312) the identity and access management server 106 to obtain the role of the user of the wireless device 112 in the WLAN 102. For example, the cloud authentication server 104 can send information identifying the user to the identity and access management server 106, which can retrieve the AD page for the user to obtain the role of the user corresponding to the PSK when accessing the WLAN 102. The identity and access management server 106 sends information of the role to the cloud authentication server 104, which in turn sends (at 314) the information of the role to the AP 110. Note that the information of the role can be sent in a message (e.g., a RADIUS Access-Accept message) of the authentication server 310 performed between the AP 110 and the cloud authentication server 104.

Upon receiving the information of the role from the cloud authentication server 104, the AP 110 can control access of the wireless device 112 in the WLAN 102 according to the role (e.g., if a guest role the AP 110 can provide restricted access in the WLAN 102 to the wireless device 112).

Figure 3B:
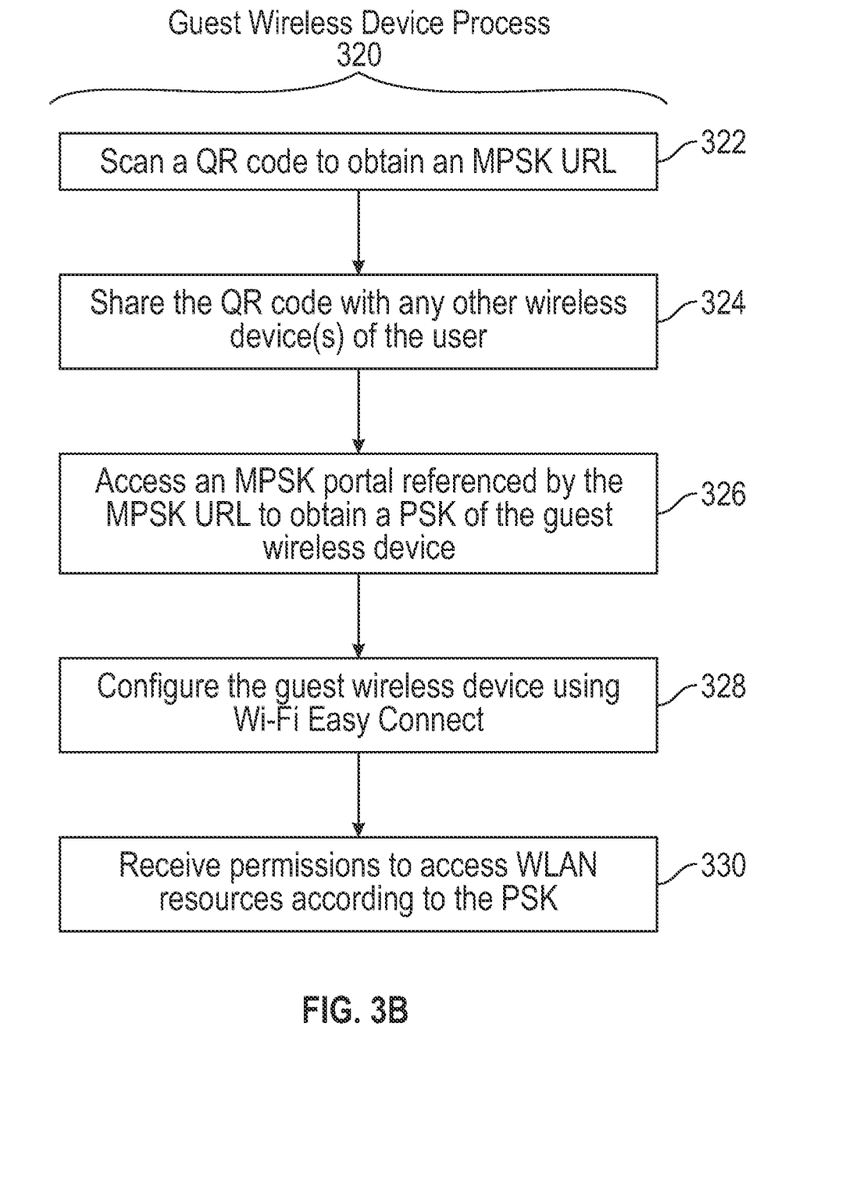
FIG. 3B is a flow diagram of a process of a guest wireless device according to some examples.

FIG. 3B is a flow diagram of a process of a guest wireless device, according to some examples. The guest wireless device is a wireless device (e.g., 112 in FIG. 1) used by a user who is a guest that wishes to use a WLAN. When the user enters physical premises (e.g., a hotel, an office building, a campus, a home, a retail facility, etc.) where the WLAN is located, the user may be presented a QR code or any other representation from which an MPSK URL can be derived. As discussed above in connection with FIGS. 2 and 3A, the QR code or any other representation can be output by the cloud authentication server 104 (e.g., task 224 in FIG. 2). The ensuing discussion refers to an example where the MPSK URL can be obtained from a QR code.

The guest wireless device scans (at 322) the QR code to obtain the MPSK URL (similar to task 302 in FIG. 3A). In some examples, if the user has one or more other wireless devices, the guest wireless device can share (at 324) the scanned QR code (or more generally, information contained in or derived from the QR code) with the one or more other wireless device. For example, if the guest wireless device is a user's phone, the other wireless device may be a tablet computer, a smart speaker, etc. By sharing the information associated with the scanned QR code to any other wireless device of the user, such other wireless device of the user can share the same PSK as the guest wireless device that performed the scanning of the QR code.

The guest wireless device accesses (at 326) an MPSK portal referenced by the MPSK URL to obtain a PSK of the guest wireless device. This task is similar to task 304 in FIG. 3A.

The guest wireless device can be configured (at 328) using Wi-Fi Easy Connect or any other mechanism. In some examples, the guest wireless device can use Wi-Fi Easy Connect to perform provisioning of the guest wireless device. Provisioning the guest wireless device can includes providing the guest wireless device with information to allow the guest wireless device a capability to access the WLAN.

Additionally, the guest wireless device receives (at 330) permissions from the AP 110 relating to what resources of the WLAN the guest wireless device is permitted to access. The permissions can be based on the role determined by the cloud authentication server 104 (e.g., tasks 312, 314 in FIG. 3A). The permissions determine what WLAN resources the guest wireless device can access and what other WLAN resources the guest wireless device is not permitted to access.

Figure 4:
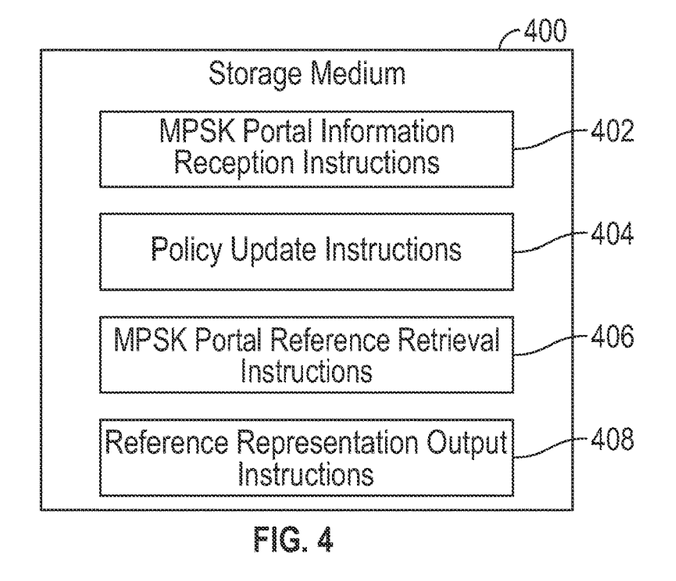
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks. The system can include a collection of computers.

The machine-readable instructions include MPSK portal information reception instructions 402 to receive, from an identity and access management server, information of whether an MPSK portal for obtaining PSKs is enabled in an MPSK arrangement is enabled. For example, the information can be sent from the identity and access management server in the response at 208 in FIG. 2.

The machine-readable instructions include policy update instructions 404 to, responsive to receiving an indication that the MPSK portal for obtaining PSKs is enabled, add, to a policy, an SSID that is associated with use of the MPSK arrangement. In some examples, the adding of the SSID to the policy can be performed in response to an administrator making an input in an administrative UI (e.g., 118 in FIG. 1).

The machine-readable instructions include MPSK portal reference retrieval instructions 406 to retrieve, in response to the policy (e.g., in response to saving the policy to the identity and access management server), a reference useable by wireless devices to obtain from the MPSK portal respective PSKs of the wireless devices. In some examples, the reference is in the form of a link (e.g., a URL) to the MPSK portal through which a wireless device is to obtain a PSK of the wireless device. For example, as shown in FIG. 1, an MPSK URL can be retrieved from the storage medium 130 of the cloud authentication server 104.

The machine-readable instructions include reference representation output instructions 408 to output a representation of the reference to share with the wireless devices to obtain the respective PSKs by the wireless devices for connecting to the WLAN. In some examples, the representation of the reference includes a QR code, a message, or any other type of representation. In some examples, the obtained respective PSKs are independent of MAC addresses of the wireless devices. The respective PSKs can be obtained without users of the wireless devices having to first enter the MAC addresses, such as to a registration portal (i.e., the registration portal can be omitted).

In some examples, the machine-readable instructions can add, in the policy, information of a role associated with a given PSK, where the role is to be associated with a user of a wireless device when the wireless device connects to the WLAN using the given PSK.

In some examples, the policy is saved to the identity and access management server, where information of the policy saved to the identity and access management server is accessible during an authentication process to authenticate a wireless device connecting to the WLAN using a PSK of the respective PSKs.

In some examples, the machine-readable instructions cause presentation, in an administrative UI (e.g., 118 in FIG. 1), of an indicator that the portal for obtaining PSKs is enabled. The adding of the SSID and information of the role to the policy is based on an administrator input in the administrative UI.

In some examples, responsive to a messaging exchange between a wireless device and an AP of the WLAN (e.g., 306 and/or 308 in FIG. 3A), the machine-readable instructions receive an authentication request from the AP (e.g., as part of the authentication procedure 310 in FIG. 3A), and in response to the authentication request, the machine-readable instructions access the identity and access management server to determine a role for the wireless device in the WLAN.

In some examples, the authentication server is a cloud authentication server. In some examples, the machine-readable instructions include, in an SSID profile of the WLAN, an indication that the cloud authentication server is to be employed for authenticating access of the wireless device to the WLAN. The authentication request from the AP is responsive to the indication in the SSID profile that the cloud authentication server is to be employed for authenticating access of the wireless device to the WLAN.

In some examples, the policy is a first policy associated with a first user, and wherein the machine-readable instructions add, to the first policy, information of a first role associated with a first PSK, and add, to a second policy associated with a second user, the SSID that is associated with use of the MPSK arrangement, and information of a second role associated with the second user, the second role being different from the first role.

In some examples, wireless devices of the first user share the first PSK.

Figure 5:
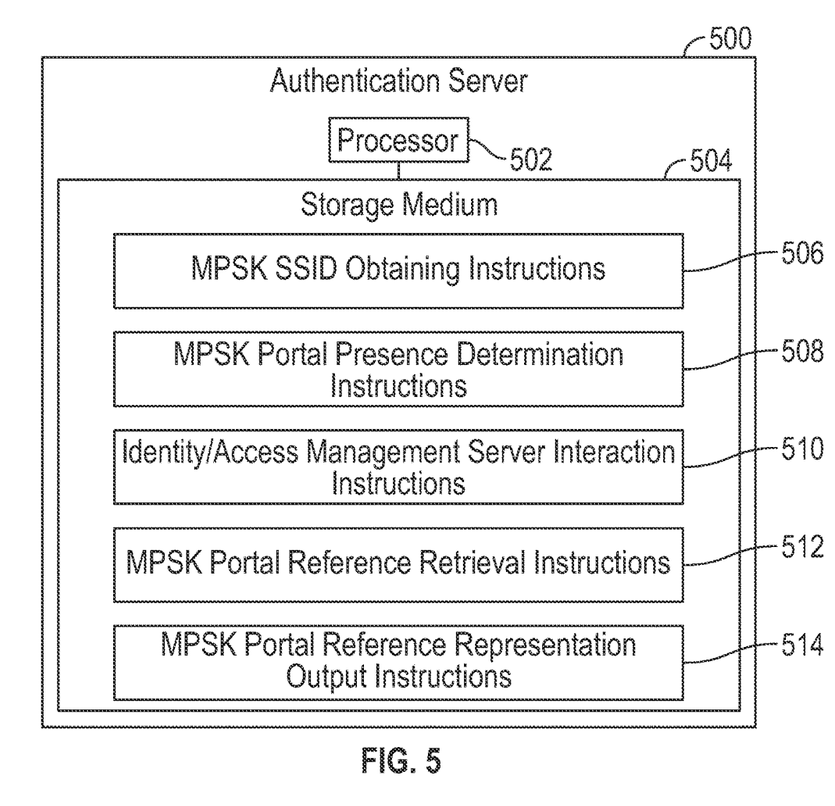
FIG. 5 is a block diagram of an authentication server according to some examples.

FIG. 5 is a block diagram of an authentication server 500 including a processor 502 and a non-transitory storage medium 504 storing machine-readable instructions executable on the processor 502 to perform various tasks. A processor can include a microprocessor, a core of a multi-core microprocessor, a microcontroller, a programmable integrated circuit, a programmable gate array, or another hardware processing circuit. Machine-readable instructions executable on a processor can refer to the instructions executable on a single processor or the instructions executable on multiple processors.

The machine-readable instructions in the storage medium 504 include MPSK SSID obtaining instructions 506 to obtain an SSID of a WLAN in which different PSKs are to be assigned to respective wireless devices. In some examples, the authentication server 500 obtains the SSID in response to a request form an administrator.

The machine-readable instructions in the storage medium 504 include MPSK portal presence determination instructions 508 to access an identity and access management server to determine whether an MPSK portal for obtaining the PSKs is enabled for the SSID. In some examples, the authentication server 500 sends a query to the identity and access management server, which may store an MPSK portal presence indicator for the SSID.

The machine-readable instructions in the storage medium 504 include identity/access management server interaction instructions 510 to, responsive to receiving an indication that the MPSK portal for obtaining the PSKs is enabled, save, to the identity and access management server, information that includes roles of users of the wireless devices. In some examples, the information is saved by saving a policy to the identity and access management server. The policy may be updated by an administrator.

The machine-readable instructions in the storage medium 504 include MPSK portal reference retrieval instructions 512 to retrieve a reference useable by wireless devices to obtain respective PSKs of the wireless devices. In some examples, the reference includes a link to the MPSK portal through which the wireless devices are to obtain the respective PSKs of the wireless devices.

The machine-readable instructions in the storage medium 504 include MPSK portal reference representation output instructions 514 to output a representation of the reference to share with the wireless devices to obtain the respective PSKs by the wireless devices for connecting to the WLAN. In some examples, the representation of the reference is output in a QR code, in a message, and so forth.

Figure 6:
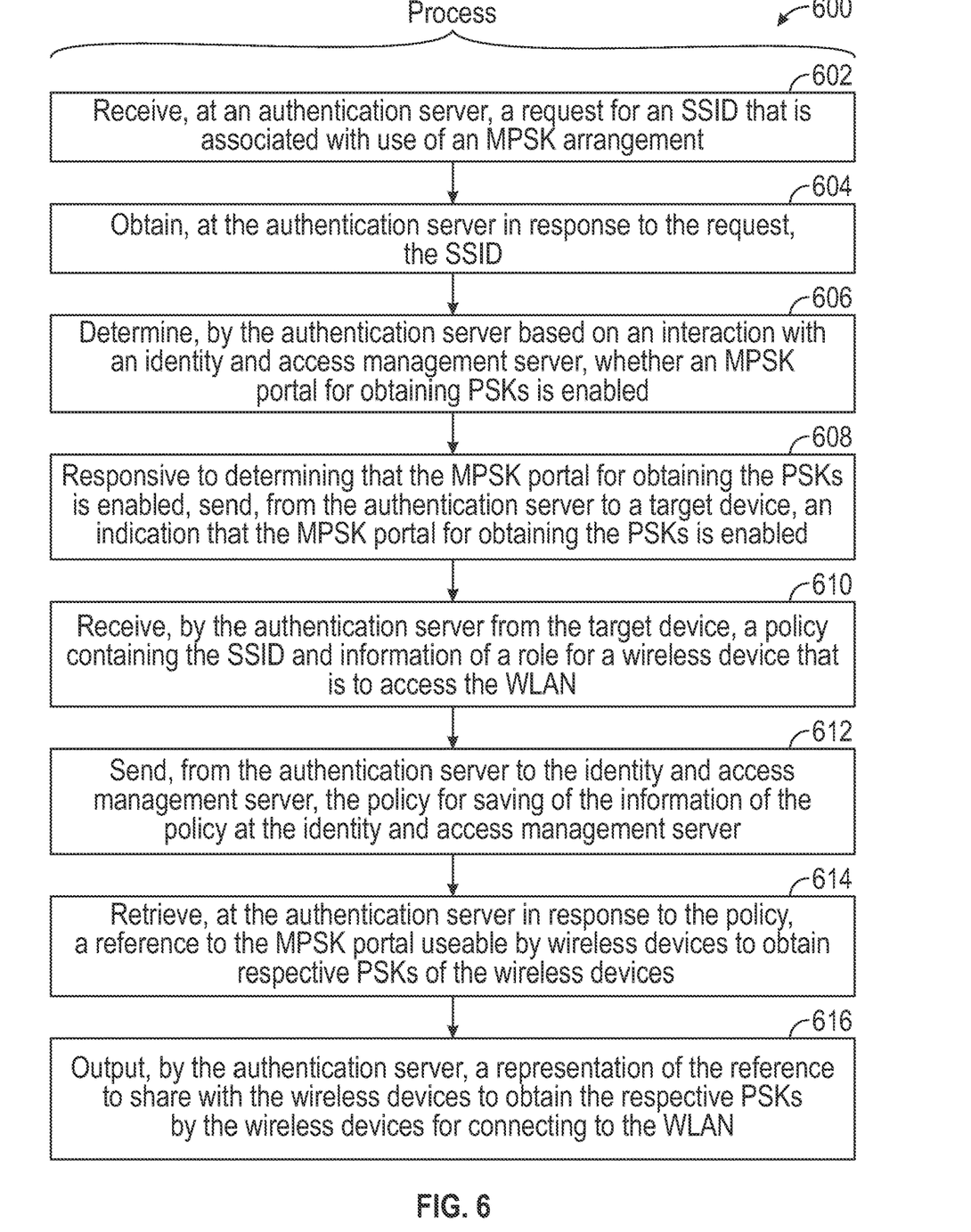
FIG. 6 is a flow diagram of a process according to some examples.

FIG. 6 is a flow diagram of a process 600 according to some examples. The process 600 includes receiving (at 602), at an authentication server, a request for an SSID that is associated with use of an MPSK arrangement. The request may be received from an administrator, such as through the administrative UI 118, for example.

The process 600 includes obtaining (at 604), at the authentication server in response to the request, the SSID. The SSID may be retrieved from a local storage medium of the authentication server, or from an external entity.

The process 600 includes determining (at 606), by the authentication server based on an interaction with an identity and access management server, whether an MPSK portal for obtaining PSKs is enabled. In some examples, the identity and access management server can store MPSK portal presence indicators for respective SSIDs (e.g., 141, 142 in FIG. 1).

The process 600 includes responsive to determining that the MPSK portal for obtaining the PSKs is enabled, sending (at 608), from the authentication server to a target device, an indication that the MPSK portal for obtaining the PSKs is enabled. The target device may be an electronic device at which the administrative UI 118 is presented, for example.

The process 600 includes receiving (at 610), by the authentication server from the target device, a policy containing the SSID and information of a role for a wireless device that is to access the WLAN. The process 600 includes sending (at 612), from the authentication server to the identity and access management server, the policy for saving of the information of the policy at the identity and access management server, such as to an AD page for a user.

The process 600 includes retrieving (at 614), at the authentication server in response to the policy, a reference to the MPSK portal useable by wireless devices to obtain respective PSKs of the wireless devices. In some examples, the reference is in the form of a URL or another type of a reference.

The process 600 includes outputting (at 616), by the authentication server, a representation of the reference to share with the wireless devices to obtain the respective PSKs by the wireless devices for connecting to the WLAN.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
    receive, from an identity and access management server, information of whether a portal for obtaining pre-shared keys (PSKs) is enabled;
    responsive to receiving an indication that the portal for obtaining PSKs is enabled, add, to a policy, a service set identifier (SSID) that is associated with use of a multi-pre-shared key (MPSK) arrangement, wherein the SSID identifies a wireless local area network (WLAN);
    retrieve, in response to the policy, a reference useable by wireless devices to obtain respective PSKs of the wireless devices; and
    output a representation of the reference to share with the wireless devices to obtain the respective PSKs from the portal by the wireless devices for connecting to the WLAN.

2. The non-transitory machine-readable storage medium of claim 1, wherein the obtained respective PSKs are independent of Media Access Control (MAC) addresses of the wireless devices.

3. The non-transitory machine-readable storage medium of claim 1, wherein the reference comprises a link to the portal through which a wireless device is to obtain a PSK of the wireless device.

4. The non-transitory machine-readable storage medium of claim 1, wherein the instructions upon execution cause the system to:
    add, in the policy, information of a role associated with a given PSK, the role to be associated with a user of a wireless device when the wireless device connects to the WLAN using the given PSK.

5. The non-transitory machine-readable storage medium of claim 1, wherein the representation of the reference comprises a quick response (QR) code.

6. The non-transitory machine-readable storage medium of claim 1, wherein the representation of the reference comprises a message.

7. The non-transitory machine-readable storage medium of claim 1, wherein the instructions upon execution cause the system to:
    save the policy to the identity and access management server, wherein information of the policy saved to the identity and access management server is accessible during an authentication process to authenticate a wireless device connecting to the WLAN using a PSK of the respective PSKs.

8. The non-transitory machine-readable storage medium of claim 1, wherein the instructions upon execution cause the system to:
    cause presentation, in an administrative user interface (UI), of an indicator that the portal for obtaining PSKs is enabled,
    wherein the adding of the SSID to the policy is based on an administrator input in the administrative UI.

9. The non-transitory machine-readable storage medium of claim 8, wherein the outputting of the representation of the reference comprises presenting the representation of the reference in a display device.

10. The non-transitory machine-readable storage medium of claim 1, wherein the instructions upon execution cause the system to:
    responsive to a messaging exchange between a wireless device and an access point (AP) of the WLAN, receive, at the system, an authentication request from the AP; and
    in response to the authentication request, access the identity and access management server to determine a role for the wireless device in the WLAN.

11. The non-transitory machine-readable storage medium of claim 10, wherein the identity and access management server stores information of a user including information of the policy.

12. The non-transitory machine-readable storage medium of claim 1, wherein the system comprises a cloud authentication server, and wherein the instructions upon execution cause the system to:
    include, in an SSID profile of the WLAN, an indication that the cloud authentication server is to be employed for authenticating access of the wireless device to the WLAN,
    wherein the authentication request from the AP is responsive to the indication in the SSID profile that the cloud authentication server is to be employed for authenticating access of the wireless device to the WLAN.

13. The non-transitory machine-readable storage medium of claim 1, wherein the policy is a first policy associated with a first user, and wherein the instructions upon execution cause the system to:
    add, to the first policy, information of a first role associated with a first PSK; and add, to a second policy associated with a second user, the SSID that is associated with use of the MPSK arrangement, and information of a second role associated with the second user, the second role being different from the first role.

14. The non-transitory machine-readable storage medium of claim 13, wherein wireless devices of the first user share the first PSK.

\* \* \* \* \*